(12) United States Patent
Abdallah

(10) Patent No.: US 11,294,680 B2
(45) Date of Patent: *Apr. 5, 2022

(54) DETERMINING BRANCH TARGETS FOR GUEST BRANCH INSTRUCTIONS EXECUTED IN NATIVE ADDRESS SPACE

(71) Applicant: Intel Corporation, Santa Clara, CA (US)

(72) Inventor: Mohammad A. Abdallah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,109

(22) Filed: Oct. 31, 2019

(65) Prior Publication Data

US 2020/0174792 A1 Jun. 4, 2020

Related U.S. Application Data

(63) Continuation of application No. 14/211,476, filed on Mar. 14, 2014, now Pat. No. 10,514,926.
(Continued)

(51) Int. Cl.
*G06F 9/32* (2018.01)
*G06F 9/38* (2018.01)
(Continued)

(52) U.S. Cl.
CPC .......... *G06F 9/322* (2013.01); *G06F 9/30174* (2013.01); *G06F 9/3806* (2013.01);
(Continued)

(58) Field of Classification Search
CPC ...... G06F 9/322; G06F 9/3806; G06F 9/3017; G06F 9/455; G06F 9/45554; G06F 9/3842; G06F 9/30174
See application file for complete search history.

(56) References Cited

U.S. PATENT DOCUMENTS 5,053,952 A 10/1991 Koopman et al.
5,396,448 A 3/1995 Takayanagi et al.
(Continued)

FOREIGN PATENT DOCUMENTS

CN 1397875 A 2/2003
CN 1823323 A 8/2006
(Continued)

OTHER PUBLICATIONS

"FIFO Architecture, Functions, and Applications", November, Texas Instruments Incorporated, p. 13 (Year: 1999).*
(Continued)

*Primary Examiner* — Courtney P Carmichael-Moody
(74) *Attorney, Agent, or Firm* — Nicholson, De Vos, Webster & Elliott, LLP

(57) ABSTRACT

A microprocessor implemented method is disclosed. The method includes mapping a plurality of instructions in a guest address space to corresponding instructions in a native address space. The method further includes, for each of one or more guest branch instructions in said native address space fetched during execution, performing the following: determining a youngest prior guest branch target stored in a guest branch target register, determining a branch target for a respective guest branch instruction by adding an offset value for said respective guest branch instruction to said youngest prior guest branch target, where said offset value is adjusted to account for a difference in address in said guest address space between an instruction at a beginning of a guest instruction block and a branch instruction in said guest instruction block. The method further includes creating an entry in said guest branch target register for said branch target.

18 Claims, 7 Drawing Sheets

Related U.S. Application Data

(60) Provisional application No. 61/792,676, filed on Mar. 15, 2013.

(51) Int. Cl.
*G06F 9/30* (2018.01)
*G06F 9/455* (2018.01)

(52) U.S. Cl.
CPC .......... *G06F 9/3842* (2013.01); *G06F 9/3005* (2013.01); *G06F 9/3836* (2013.01); *G06F 9/3867* (2013.01); *G06F 9/455* (2013.01)

(56) References Cited

U.S. PATENT DOCUMENTS

| | | | |
|---|---|---|---|
| 5,546,552 A | 8/1996 | Coon et al. | |
| 5,623,617 A | 4/1997 | Davidian | |
| 5,651,124 A | 7/1997 | Shen et al. | |
| 5,651,135 A | 7/1997 | Hatakeyama | |
| 5,742,802 A | 4/1998 | Harter et al. | |
| 5,761,467 A | 6/1998 | Ando | |
| 5,784,638 A | 7/1998 | Goetz et al. | |
| 5,870,575 A | 2/1999 | Kahle et al. | |
| 5,893,121 A | 4/1999 | Ebrahim et al. | |
| 5,953,520 A | 9/1999 | Mallick | |
| 5,956,495 A | 9/1999 | Kahle et al. | |
| 5,961,639 A | 10/1999 | Mallick et al. | |
| 5,974,525 A | 10/1999 | Lin et al. | |
| 5,995,743 A | 11/1999 | Kahle et al. | |
| 6,138,225 A | 10/2000 | Upton et al. | |
| 6,142,682 A | 11/2000 | Skogby | |
| 6,202,127 B1 | 3/2001 | Dean et al. | |
| 6,205,545 B1 | 3/2001 | Shah et al. | |
| 6,305,013 B1 | 10/2001 | Miyamoto | |
| 6,327,650 B1 | 12/2001 | Bapst et al. | |
| 6,463,582 B1 | 10/2002 | Lethin et al. | |
| 6,594,728 B1 | 7/2003 | Yeager | |
| 6,647,489 B1* | 11/2003 | Col | G06F 9/3853 712/226 |
| 6,711,672 B1 | 3/2004 | Agesen | |
| 6,813,763 B1 | 11/2004 | Takahashi et al. | |
| 6,898,699 B2 | 5/2005 | Jourdan et al. | |
| 6,928,641 B1 | 8/2005 | Szewerenko et al. | |
| 7,069,413 B1 | 6/2006 | Agesen et al. | |
| 7,080,366 B2 | 7/2006 | Kramskoy et al. | |
| 7,107,437 B1 | 9/2006 | Padwekar | |
| 7,111,145 B1 | 9/2006 | Chen et al. | |
| 7,203,932 B1 | 4/2007 | Gaudet et al. | |
| 7,225,436 B1 | 5/2007 | Patel | |
| 7,278,030 B1 | 10/2007 | Chen et al. | |
| 7,428,626 B2 | 9/2008 | Vega | |
| 7,568,189 B2 | 7/2009 | Suba et al. | |
| 7,571,090 B2 | 8/2009 | Kinney | |
| 7,577,944 B2 | 8/2009 | de Dinechin | |
| 7,590,982 B1 | 9/2009 | Weissman | |
| 7,613,903 B2 | 11/2009 | Yoshida | |
| 7,617,493 B2 | 11/2009 | Mitran et al. | |
| 7,644,210 B1 | 1/2010 | Banning et al. | |
| 7,734,895 B1 | 6/2010 | Agarwal et al. | |
| 7,752,417 B2 | 7/2010 | Manczak et al. | |
| 7,877,741 B2 | 1/2011 | Lin et al. | |
| 8,099,730 B2 | 1/2012 | Wang et al. | |
| 8,131,534 B2 | 3/2012 | Kinney | |
| 8,190,664 B2 | 5/2012 | Lundvall et al. | |
| 8,301,434 B2 | 10/2012 | Bohizic et al. | |
| 8,370,819 B2 | 2/2013 | Chakraborty et al. | |
| 8,428,930 B2 | 4/2013 | Bohizic et al. | |
| 8,438,334 B2 | 5/2013 | Bell et al. | |
| 8,555,041 B2 | 10/2013 | Renno et al. | |
| 8,561,040 B2 | 10/2013 | Rose | |
| 8,589,143 B2 | 11/2013 | Koh et al. | |
| 8,769,241 B2 | 7/2014 | Chiang et al. | |
| 8,799,879 B2 | 8/2014 | Wright et al. | |
| 8,819,647 B2 | 8/2014 | Mitran et al. | |
| 8,832,354 B2 | 9/2014 | Sokolov et al. | |
| 8,959,277 B2 | 2/2015 | Vick et al. | |
| 9,158,566 B2 | 10/2015 | Bohizic et al. | |
| 9,207,960 B2 | 12/2015 | Abdallah | |
| 9,477,453 B1 | 10/2016 | Ince et al. | |
| 9,542,187 B2 | 1/2017 | Abdallah | |
| 2001/0013093 A1 | 8/2001 | Banno et al. | |
| 2001/0037492 A1 | 11/2001 | Holzmann | |
| 2002/0042863 A1 | 4/2002 | Jeddeloh | |
| 2002/0066081 A1 | 5/2002 | Duesterwald et al. | |
| 2002/0066083 A1 | 5/2002 | Patel et al. | |
| 2002/0083302 A1 | 6/2002 | Nevill et al. | |
| 2002/0100022 A1 | 7/2002 | Holzmann | |
| 2002/0138712 A1 | 9/2002 | Yoshida | |
| 2002/0194464 A1 | 12/2002 | Henry et al. | |
| 2002/0199091 A1 | 12/2002 | Tago et al. | |
| 2003/0046519 A1 | 3/2003 | Richardson | |
| 2003/0120906 A1 | 6/2003 | Jourdan et al. | |
| 2003/0191792 A1 | 10/2003 | Waki et al. | |
| 2004/0044880 A1 | 3/2004 | Altman et al. | |
| 2004/0128658 A1 | 7/2004 | Lueh et al. | |
| 2004/0133760 A1 | 7/2004 | Thimmannagari | |
| 2004/0133769 A1 | 7/2004 | Chaudhry et al. | |
| 2004/0154006 A1 | 8/2004 | Heishi et al. | |
| 2005/0240731 A1 | 10/2005 | Steely, Jr. | |
| 2006/0026365 A1 | 2/2006 | Yamazaki | |
| 2006/0026408 A1 | 2/2006 | Morris et al. | |
| 2006/0112261 A1 | 5/2006 | Yourst et al. | |
| 2006/0117308 A1 | 6/2006 | Hirayanagi et al. | |
| 2006/0206687 A1 | 9/2006 | Vega | |
| 2006/0224816 A1 | 10/2006 | Yamada et al. | |
| 2007/0006178 A1 | 1/2007 | Tan | |
| 2007/0079296 A1 | 4/2007 | Li et al. | |
| 2007/0124736 A1 | 5/2007 | Gabor et al. | |
| 2007/0174717 A1 | 7/2007 | Vamsee et al. | |
| 2007/0234358 A1 | 10/2007 | Hattori et al. | |
| 2007/0283125 A1 | 12/2007 | Manczak et al. | |
| 2008/0028195 A1 | 1/2008 | Kissell et al. | |
| 2008/0288238 A1 | 11/2008 | Heller, Jr. | |
| 2008/0301420 A1 | 12/2008 | Inoue | |
| 2008/0320286 A1 | 12/2008 | Campbell et al. | |
| 2009/0007105 A1 | 1/2009 | Fries et al. | |
| 2009/0049234 A1 | 2/2009 | Oh et al. | |
| 2009/0089488 A1 | 4/2009 | Yasui | |
| 2009/0094586 A1 | 4/2009 | Brown et al. | |
| 2009/0119493 A1 | 5/2009 | Venkitachalam et al. | |
| 2009/0164991 A1 | 6/2009 | Takashige et al. | |
| 2009/0172642 A1 | 7/2009 | Lai | |
| 2009/0182973 A1 | 7/2009 | Greiner et al. | |
| 2009/0182985 A1 | 7/2009 | Greiner et al. | |
| 2009/0187697 A1 | 7/2009 | Serebrin | |
| 2009/0187731 A1 | 7/2009 | Deutschle et al. | |
| 2009/0187902 A1 | 7/2009 | Serebrin | |
| 2009/0228882 A1 | 9/2009 | Wang et al. | |
| 2009/0248611 A1 | 10/2009 | Xu et al. | |
| 2009/0254709 A1 | 10/2009 | Agesen | |
| 2009/0300263 A1 | 12/2009 | Devine et al. | |
| 2009/0300645 A1 | 12/2009 | Devine et al. | |
| 2010/0058358 A1 | 3/2010 | Franke et al. | |
| 2010/0115497 A1 | 5/2010 | Das et al. | |
| 2010/0153662 A1 | 6/2010 | Vick et al. | |
| 2010/0153690 A1 | 6/2010 | Vick et al. | |
| 2010/0161875 A1 | 6/2010 | Chang et al. | |
| 2010/0161950 A1* | 6/2010 | Caprioli | G06F 9/322 712/234 |
| 2010/0274973 A1 | 10/2010 | Balakrishnan et al. | |
| 2010/0275049 A1 | 10/2010 | Balakrishnan et al. | |
| 2010/0333090 A1 | 12/2010 | Wright et al. | |
| 2011/0023027 A1 | 1/2011 | Kegel et al. | |
| 2011/0071814 A1 | 3/2011 | Bohizic et al. | |
| 2011/0112820 A1 | 5/2011 | Bohizic et al. | |
| 2011/0113223 A1 | 5/2011 | Cavanna et al. | |
| 2011/0153307 A1 | 6/2011 | Winkel et al. | |
| 2011/0231593 A1 | 9/2011 | Yasufuku et al. | |
| 2011/0238962 A1 | 9/2011 | Cain et al. | |
| 2011/0320756 A1 | 12/2011 | Craddock et al. | |
| 2011/0321061 A1 | 12/2011 | Craddock et al. | |
| 2012/0089982 A1 | 4/2012 | Wang et al. | |
| 2012/0198122 A1 | 8/2012 | Abdallah | |
| 2012/0198157 A1 | 8/2012 | Abdallah | |

(56) References Cited

U.S. PATENT DOCUMENTS

| | | | |
|---|---|---|---|
| 2012/0198168 A1 | 8/2012 | Abdallah | |
| 2012/0198209 A1 | 8/2012 | Abdallah | |
| 2012/0297109 A1 | 11/2012 | Guthrie et al. | |
| 2013/0024619 A1 | 1/2013 | Abdallah | |
| 2013/0024661 A1 | 1/2013 | Abdallah | |
| 2013/0138931 A1 | 5/2013 | Gunna et al. | |
| 2013/0246766 A1 | 9/2013 | Gschwind | |
| 2013/0339672 A1 | 12/2013 | Jacobi et al. | |
| 2014/0025893 A1 | 1/2014 | Brown | |
| 2014/0258696 A1 | 9/2014 | Srikantaiah | |
| 2014/0281388 A1 | 9/2014 | Abdallah | |
| 2014/0281410 A1 | 9/2014 | Abdallah | |
| 2016/0026488 A1 | 1/2016 | Bond et al. | |
| 2017/0003967 A1 | 1/2017 | Lin | |

FOREIGN PATENT DOCUMENTS

| | | | |
|---|---|---|---|
| CN | 101122881 A | 2/2008 | |
| CN | 101506773 A | 8/2009 | |
| CN | 101815984 A | 8/2010 | |
| EP | 1555617 A2 | 7/2005 | |
| TW | I287801 B | 10/2007 | |
| TW | 201250583 A | 12/2012 | |
| WO | 97/37301 A1 | 10/1997 | |

OTHER PUBLICATIONS

Notice of Allowance, U.S. Appl. No. 13/359,832, dated Jan. 13, 2017, pp. 1-12.
Notice of Allowance, U.S. Appl. No. 13/359,832, dated Jan. 7, 2016, pp. 1-12.
Notice of Allowance, U.S. Appl. No. 13/359,832, dated Jun. 8, 2015, pp. 1-12.
Notice of Allowance, U.S. Appl. No. 13/359,832, dated May 17, 2016, pp. 1-14.
Notice of Allowance, U.S. Appl. No. 13/359,832, dated Sep. 14, 2016, pp. 1-12.
Notice of Allowance, U.S. Appl. No. 13/359,832, dated Sep. 18, 2015, pp. 1-12.
Notice of Allowance, U.S. Appl. No. 13/359,939, dated Aug. 25, 2014, pp. 1-15.
Notice of Allowance, U.S. Appl. No. 13/359,939, dated Dec. 9, 2016, pp. 1-12.
Notice of Allowance, U.S. Appl. No. 13/359,939, dated Dec. 28, 2015, pp. 1-12.
Notice of Allowance, U.S. Appl. No. 13/359,939, dated Dec. 3, 2014, pp. 1-12.
Notice of Allowance, U.S. Appl. No. 13/359,939, dated Mar. 30, 2015, pp. 1-12.
Notice of Allowance, U.S. Appl. No. 13/359,939, dated May 12, 2014, pp. 1-13.
Notice of Allowance, U.S. Appl. No. 13/359,939, dated May 6, 2016, pp. 1-12.
Notice of Allowance, U.S. Appl. No. 13/359,939, dated Sep. 1, 2015, pp. 1-12.
Notice of Allowance, U.S. Appl. No. 13/359,939, dated Sep. 2, 2016, pp. 1-12.
Notice of Allowance, U.S. Appl. No. 13/359,961, dated Jul. 11, 2014, pp. 1-13.
Notice of Allowance, U.S. Appl. No. 13/359,961, dated Jul. 15, 2015, pp. 1-12.
Notice of Allowance, U.S. Appl. No. 13/359,961, dated Mar. 26, 2015, pp. 1-12.
Notice of Allowance, U.S. Appl. No. 13/359,961, dated Oct. 28, 2014, pp. 1-14.
Notice of Allowance, U.S. Appl. No. 13/360,024, dated Jan. 10, 2017, pp. 1-9.
Notice of Allowance, U.S. Appl. No. 13/360,024, dated Jan. 20, 2015, pp. 1-6.
Notice of Allowance, U.S. Appl. No. 13/360,024, dated Jul. 5, 2016, pp. 1-10.
Notice of Allowance, U.S. Appl. No. 13/360,024, dated Mar. 1, 2016, pp. 1-11.
Notice of Allowance, U.S. Appl. No. 13/360,024, dated Mar. 23, 2017, pp. 1-9.
Notice of Allowance, U.S. Appl. No. 13/360,024, dated May 1, 2015, pp. 1-10.
Notice of Allowance, U.S. Appl. No. 13/360,024, dated Oct. 28, 2015, pp. 1-10.
Notice of Allowance, U.S. Appl. No. 14/211,476, dated Aug. 21, 2019, pp. 1-19.
Notice of Allowance, U.S. Appl. No. 14/961,464, dated Sep. 19, 2018, pp. 1-8.
Notice of Allowance, U.S. Appl. No. 15/009,684, dated Apr. 17, 2017, pp. 1-20.
Notice of Allowance, U.S. Appl. No. 15/009,684, dated Dec. 29, 2016, pp. 1-9.
Notice of Allowance, U.S. Appl. No. 15/176,079, dated Nov. 24, 2017, pp. 1-27.
Notice of Allowance, U.S. Appl. No. 15/208,404, dated Nov. 23, 2018, pp. 1-18.
Notice of Allowance, U.S. Appl. No. 15/353,472, dated Jun. 17, 2019, pp. 1-68.
Notice of Allowance, U.S. Appl. No. 15/354,679, dated Mar. 28, 2018, pp. 1-25.
Notice of Preliminary Rejection, Korean Appl. No. 20157029321, dated Oct. 13, 2016, pp. 1-8.
Notification of Reason for Refusal, Korean Appl. No. 1020137022671, dated Sep. 15, 2015, 5 pages.
Second Office Action, Chinese Appl. No. 201280012962.8, dated Jan. 22, 2017, pp. 1-8.
Third Office Action, Chinese Appl. No. 201280012962.8, dated Sep. 21, 2017, pp. 1-8.
Varanasi, et al., "Hardware-supported virtualization on ARM," Proceedings of the Second Asia-Pacific Workshop on Systems, ACM, Jul. 2011, pp. 1-5, downloaded from http://ts.data61.csiro.au/publications/nicta_full_text/4938.pdf on Sep. 8, 2018.
International Search Report and Written Opinion, Intl. Appl. No. PCT/US2012/022589, dated Aug. 29, 2012, pp. 1-7.
International Search Report and Written Opinion, Intl. Appl. No. PCT/US2012/022598, dated Aug. 28, 2012, pp. 1-7.
International Search Report and Written Opinion, Intl. Appl. No. PCT/US2012/022773, dated Sep. 20, 2012, pp. 1-9.
International Search Report and Written Opinion, Intl. Appl. No. PCT/US2012/022780, dated Jul. 31, 2012, pp. 1-7.
International Search Report and Written Opinion, Intl. Appl. No. PCT/US2014/026176, dated Jun. 27, 2014, pp. 1-7.
International Search Report and Written Opinion, Intl. Appl. No. PCT/US2014/026252, dated Jun. 27, 2014, pp. 1-8.
International Search Report and Written Opinion, Intl. Appl.No. PCT/US2012/022760, dated Jul. 16, 2012, pp. 1-7.
Irvine, K.R., "Assembly Language for Intel-based Computers," 5th edition, Jun. 2006, copyright Prentice Hall PTR 2007, p. 7.
Mihocka, et al., "Virtualization without Direct Execution or Jitting: Designing a Portable Virtual Machine Infrastructure," 1st Workshop on Architectural and Micro-architectural Support for Binary Translation in ISCA-35, Jun. 2008, 16 pages, downloaded from http://index-of.es/Misc/Virtualization/WithoutHardwareFinal.pdf on Feb. 9, 2015.
Non Final Office Action, U.S. Appl. No. 14/211,476, dated Jul. 10, 2018, pp. 1-70.
Non-Final Office Action, U.S. Appl. No. 13/359,767, dated Jul. 16, 2015, pp. 1-28.
Non-Final Office Action, U.S. Appl. No. 13/359,767, dated Oct. 23, 2013, pp. 1-20.
Non-Final Office Action, U.S. Appl. No. 13/359,767, dated Sep. 23, 2014, pp. 1-29.
Non-Final Office Action, U.S. Appl. No. 13/359,817, dated Aug. 27, 2014, pp. 1-16.
Non-Final Office Action, U.S. Appl. No. 13/359,832, dated Oct. 22, 2013, 15 pages.

(56) References Cited

OTHER PUBLICATIONS

Non-Final Office Action, U.S. Appl. No. 13/359,832, dated Sep. 23, 2014, pp. 1-27.
Non-Final Office Action, U.S. Appl. No. 13/359,939, dated Nov. 5, 2013, pp. 1-6.
Non-Final Office Action, U.S. Appl. No. 13/359,961, dated Dec. 17, 2013, pp. 1-10.
Non-Final Office Action, U.S. Appl. No. 13/360,024, dated Sep. 29, 2014, pp. 1-19.
Non-Final Office Action, U.S. Appl. No. 14/211,476, dated Apr. 6, 2017, pp. 1-38.
Non-Final Office Action, U.S. Appl. No. 14/211,476, dated Aug. 9, 2016, pp. 1-22.
Non-Final Office Action, U.S. Appl. No. 14/211,476, dated Feb. 22, 2016, pp. 1-23.
Non-Final Office Action, U.S. Appl. No. 14/211,655, dated Apr. 18, 2018, pp. 1-82.
Non-Final Office Action, U.S. Appl. No. 14/211,655, dated Dec. 29, 2016, pp. 1-24.
Non-Final Office Action, U.S. Appl. No. 14/211,655, dated Mar. 2, 2016, pp. 1-19.
Non-Final Office Action, U.S. Appl. No. 14/961,464, dated Nov. 20, 2017, pp. 1-51.
Non-Final Office Action, U.S. Appl. No. 15/009,684, dated Aug. 24, 2016, pp. 1-10.
Non-Final Office Action, U.S. Appl. No. 15/042,005, dated Jan. 22, 2018, pp. 1-10.
Non-Final Office Action, U.S. Appl. No. 15/176,079, dated Jul. 13, 2017, pp. 1-39.
Non-Final Office Action, U.S. Appl. No. 15/208,404, dated Apr. 5, 2015, pp. 1-25.
Non-Final Office Action, U.S. Appl. No. 15/208,404, dated Jul. 6, 2017, pp. 1-33.
Non-Final Office Action, U.S. Appl. No. 15/208,404, dated Oct. 3, 2016, pp. 1-26.
Non-Final Office Action, U.S. Appl. No. 15/353,507, dated Apr. 15, 2019, pp. 1-69.
Non-Final Office Action, U.S. Appl. No. 15/353,549, dated Feb. 13, 2019, pp. 1-70.
Non-Final Office Action, U.S. Appl. No. 15/354,679, dated Mar. 21, 2017, pp. 1-19.
Non-Final Office Action, U.S. Appl. No. 15/650,230, dated Nov. 14, 2018, pp. 1-71.
Notice of Abandonment, U.S. Appl. No. 15/042,005, dated Aug. 3, 2018, pp. 1-2.
Notice of Allowance, U.S. Appl. No. 14/211,655, dated Nov. 7, 2018, pp. 1-17.
Notice of Allowance, U.S. Appl. No. 13/359,767, dated Apr. 11, 2016, pp. 1-12.
Notice of Allowance, U.S. Appl. No. 13/359,767, dated Aug. 8, 2016, pp. 1-12.
Notice of Allowance, U.S. Appl. No. 13/359,767, dated Dec. 16, 2015, pp. 1-8.
Notice of Allowance, U.S. Appl. No. 13/359,767, dated Mar. 14, 2017, pp. 1-14.
Notice of Allowance, U.S. Appl. No. 13/359,767, dated Nov. 15, 2016, pp. 1-12.
Notice of Allowance, U.S. Appl. No. 13/359,817, dated Feb. 19, 2015, pp. 1-8.
Notice of Allowance, U.S. Appl. No. 13/359,817, dated Feb. 26, 2016, pp. 1-9.
Notice of Allowance, U.S. Appl. No. 13/359,817, dated Jan. 20, 2015, pp. 1-13.
Notice of Allowance, U.S. Appl. No. 13/359,817, dated May 1, 2015, pp. 1-9.
Notice of Allowance, U.S. Appl. No. 13/359,817, daed Sep. 11, 2015, pp. 1-9.
Notice of Allowance, U.S. Appl. No. 13/359,817, dated Sep. 9, 2016, pp. 1-14.
Notice of Allowance, U.S. Appl. No. 13/359,832, dated Feb. 19, 2015, pp. 1-8.
Advisory Action, U.S. Appl. No. 14/211,476, dated Mar. 28, 2019, pp. 1-5.
Advisory Action, U.S. Appl. No. 14/211,655, dated Aug. 28, 2017, pp. 1-3.
Advisory Action, U.S. Appl. No. 15/208,404, dated May 19, 2017, 2 pages.
Advisory Action, U.S. Appl. No. 15/353,549, dated Aug. 14, 2019, pp. 1-3.
Advisory Action, U.S. Appl. No. 15/650,230, dated Jul. 29, 2019, pp. 1-4.
Beck, L.L.,"System Software," 3rd edition, Section 2.4 and Appendix A SIC/XE Instruction Set and Addressing Modes, Aug. 1996, Addison-Wesley Longman Publishing Co. copyright 1997, pp. 50-54, 93, and 495-499.
Bhargava, et al., "Accelerating two-dimensional p. walks for virtualized systems," ACM SIGOPS Operating Systems Review, Mar. 2008, pp. 26-35, downloaded from http://dl.acm.org/citation.cfm?id=1346286 on Mar. 19, 2015.
Bungale, et al., "PinOS: a programmable framework for whole-system dynamic instrumentation," VEE '07, Proceedings of the 3rd international conference on Virtual execution environments, ACM, Jun. 2007, pp. 137-147, downloaded from http://dl.acm.org/citation.cfm?id=1254830 on Jul. 6, 2015.
Chu, P.P., "RTL Hardware Design Using VHDL," John Wiley & Sons, Apr. 2006, pp. 279-281.
Communication pursuant to Article 94(3) EPC, European Appl. No. 12739955.8, dated Apr. 14, 2015, pp. 1-3.
Communication pursuant to Article 94(3) EPC, European Appl. No. 12739955.8, dated Feb. 22, 2017, pp. 1-3.
Communication pursuant to Article 94(3) EPC, European AppL No. 14770972.9, dated Mar. 5, 2019, pp. 1-6.
Du, et al., "Performance Profiling of Virtual Machines," ACM Sigplan Notices, vol. 46 (7), Jul. 2011, 13 pages, downloaded from https://dl.acm.org/citation.cfm?id=1952686 on Sep. 8, 2018.
Duesterwald, E., "Design and Engineering of a Dynamic Binary Optimizer," Proceedings of the IEEE, vol. 93(2), 2005, pp. 436-448, downloaded from http://ieeexplore.IEEE.org/stamp.jsp?tp=&anumber=1386661 on Jul. 9, 2014.
Extended European Search Report, European Appl. No. 12739955.8, dated Aug. 4, 2014, pp. 1-6.
Extended European Search Report, European Appl. No. 14770972.9, dated Mar. 17, 2017, pp. 1-8.
Final Office Action, U.S. Appl. No. 15/353,507, dated Oct. 17, 2019, pp. 1-10.
Final Office Action, U.S. Appl. No. 13/359,767, dated Feb. 26, 2015, pp. 1-23.
Final Office Action, U.S. Appl. No. 13/359,767, dated May 14, 2014, pp. 1-32.
Final Office Action, U.S. Appl. No. 13/359,832, dated May 27, 2014, pp. 1-24.
Final Office Action, U.S. Appl. No. 14/211,476, dated Dec. 13, 2016, pp. 1-23.
Final Office Action, U.S. Appl. No. 14/211,476, dated Jan. 7, 2019, pp. 1-51.
Final Office Action, U.S. Appl. No. 14/211,476, dated Oct. 13, 2017, pp. 1-32.
Final Office Action, U.S. Appl. No. 14/211,655, dated Aug. 9, 2016, pp. 1-29.
Final Office Action, U.S. Appl. No. 14/211,655, dated Jun. 8, 2017, pp. 1-41.
Final Office Action, U.S. Appl. No. 14/961,464, dated Jun. 13, 2018, pp. 1-27.
Final Office Action, U.S. Appl. No. 15/208,404, dated Feb. 15, 2017, pp. 1-26.
Final Office Action, U.S. Appl. No. 15/208,404, dated Nov. 3, 2017, pp. 1-35.
Final Office Action, U.S. Appl. No. 15/208,404, dated Sep. 10, 2018, pp. 1-22.
Final Office Action, U.S. Appl. No. 15/353,549, dated May 10, 2019, pp. 1-14.

(56) References Cited

OTHER PUBLICATIONS

Final Office Action, U.S. Appl. No. 15/354,679, dated Sep. 14, 2017, pp. 1-39.
Final Office Action, U.S. Appl. No. 15/650,230, dated May 2, 2019, pp. 1-29.
First Office Action and Search Report, Chinese Appl. No. 201480021703.0, dated Dec. 15, 2017, pp. 1-30 pages.
First Office Action, Chinese Appl. No. 201280012962.8, dated May 20, 2016, pp. 1-15.
Fisher-Ogden, J., "Hardware support for efficient virtualization." University of California, San Diego, Tech. Rep., 2006, pp. 1-12, downloaded from http://dator8.info/2010/27.pdf on Jul. 9, 2014.
Gligor, et al., "Using Binary Translation in Event Driven Simulation for Fast and Flexible MPSoC Simulation," Proceedings of the 7th IEEE/ACM International Conference on Hardware/Software co-design and system synthesis, ACM, Oct. 2009, pp. 71-80, downloaded from http://dl.acm.org/citation.cfm?id=1629446 on Jul. 6, 2015.
Grant of Patent, Chinese Appl. No. 201280012962.8, dated Apr. 9, 2018, pp. 1-4.
Grant of Patent, Chinese Appl. No. 201480021703.0, dated Aug. 2, 2018, pp. 1-4.
Grant of Patent, Korean Appl. No. 10-2013-7022671, dated Mar. 2, 2016, 2 pages.
Grant of Patent, Korean Appl. No. 10-2015-7029321, dated Apr. 28, 2017, pp. 1-2.
Guan, et al., "CoDBT: A Multi-Source Dynamic Binary Translator using Hardware-Software Collaborative Techniques," Journal of Systems Architecture; Shanghai Jiao Tong University, Oct. 2010, vol. 56(10), pp. 500-508.
International Preliminary Reporton Patentability, Intl. Appl. No. PCT/US2012/022538, dated Aug. 8, 2013, pp. 1-8.
International Preliminary Reporton Patentability, Intl. Appl. No. PCT/US2012/022589, dated Aug. 8, 2013, pp. 1-6.
International Preliminary Reporton Patentability, Intl. Appl. No. PCT/US2012/022598, dated Aug. 8, 2013, pp. 1-6.
International Preliminary Reporton Patentability, Intl. Appl. No. PCT/US2012/022760, dated Aug. 8, 2013, pp. 1-6.
International Preliminary Report on Patentability, Int. Appl. No. PCT/US2012/022773, dated Aug. 8, 2013, pp. 1-7.
International Preliminary Report on Patentability, Intl. Appl. No. PCT/US2012/022780, dated Aug. 8, 2013, pp. 1-6.
International Preliminary Report on Patentability, Intl. Appl. No. PCT/US2014/026176, dated Sep. 24, 2015, pp. 1-6.
International Preliminary Report on Patentability, Intl. Appl. No. PCT/US2014/026252, dated Sep. 24, 2015, pp. 1-7.
International Search Report and Written Opinion, Intl. Appl. No. PCT/US2012/022538, dated Jul. 30, 2012, 9 pages.
Final Office Action, U.S. Appl. No. 15/353,507, dated Jul. 21, 2020, 12 pages.
Notice of Allowance, U.S. Appl. No. 16/251,941, dated Aug. 6, 2020, 5 pages.
Advisory Action, U.S. Appl. No. 15/353,50, dated Jan. 10, 2020, 2 pages.
Decision to grant a European patent, EP App. No. 14770972.9, dated May 25, 2020, 2 pages.
Decision to Grant, EP App. No. 12739955.8, dated Oct. 10, 2019, 2 pages.
Examination Report, IN App. No. 5852/CHENP/2013, dated Aug. 7, 2019, 6 pages.
Intention to Grant a Patent, EP App No. 14770972.9, dated Feb. 24, 2020, 7 pages.
Non-Final Office Action, U.S. Appl. No. 15/353,507, dated Feb. 20, 2020, 8 pages.
Non-Final Office Action, U.S. Appl. No. 16/251,941, dated May 29, 2020, 13 pages.
Examination Report, IN App. No. 5510/CHENP/2015, dated Jul. 17, 2020, 6 pages.
Decision on Appeal, U.S. Appl. No. 15/353,549, dated Sep. 2, 2021, 8 pages.
Decision on Appeal, U.S. Appl. No. 15/650,230, dated Sep. 9, 2021, 18 pages.
Office Action, CN App. No. 201811210995.9, dated Jun. 7, 2021, 05 Pages of Original Document Only.

* cited by examiner

DETERMINING BRANCH TARGETS FOR GUEST BRANCH INSTRUCTIONS EXECUTED IN NATIVE ADDRESS SPACE

CROSS-REFERENCE TO RELATED APPLICATIONS

This application is a continuation of U.S. application Ser. No. 14/211,476 filed Mar. 14, 2014 (now U.S. Pat. No. 10,514,926 issued Dec. 24, 2019), which claims the benefit of U.S. Provisional Application No. 61/792,676 filed Mar. 15, 2013, which is hereby incorporated by reference.

This application is related to U.S. application Ser. No. 13/359,767 filed Jan. 27, 2012 (now U.S. Pat. No. 9,710,387 issued Jul. 18, 2017), titled "GUEST INSTRUCTION TO NATIVE INSTRUCTION RANGE BASED MAPPING USING A CONVERSION LOOK ASIDE BUFFER OF A PROCESSOR," which is hereby incorporated by reference.

This application is related to U.S. application Ser. No. 14/211,655 filed Mar. 14, 2014 (now U.S. Pat. No. 10,228,950 issued Mar. 12, 2019), titled "METHOD AND APPARATUS FOR GUEST RETURN ADDRESS STACK EMULATION SUPPORTING SPECULATION," which is hereby incorporated by reference.

FIELD OF THE INVENTION

Embodiments according to the present invention generally relate to microprocessor architecture and more particularly to the architecture for out-of-order microprocessors.

BACKGROUND OF THE INVENTION

In an Out-Of-Order ("OOO") microprocessor, instructions are allowed to issue out of their program order. However, in most cases, they are required to retire from the machine in order. Further, memory operations in the machine, regardless of the issue order, need to acquire and update memory status in program order. These diverging ordering behaviors give rise to problems at several locations in a micro-architecture.

For example, in an OOO microprocessor, the instructions executing out of order need to preserve their data dependence constraints. Because instructions may finish in an arbitrary order, the architectural register file cannot be modified by the instructions as they finish because it would make it difficult to restore their values accurately in the event of an exception or an interrupt. To achieve high performance, register renaming is commonly used with the temporary register storage to allow the OOO processor to resolve false dependencies between instructions. Hence, every instruction that enters the pipeline is provided a temporary register where it can save its result. The temporary registers are eventually written into the architectural register file in program order. Thus, even though instructions are being executed out of order, the contents of the architectural register files change as though they were being executed in program order.

The architectural register file is typically maintained in the back-end of the OOO processor. As a result of using temporary register storage along with register renaming, instructions with write-after-write (WAW) and write-after-read (WAR) hazards can be issued out-of-order in conventional OOO processors.

There are cases in OOO microprocessor design where a value generated from a General Purpose Register ("GPR"), an architectural register also maintained at the back-end of the machine, could determine the control flow of the program (in the case of indirect branches), or could cause instructions or data values to be treated differently. In conventional OOO processors, instructions following a state producing instruction involving a GPR need to wait for the state producing instruction to get committed before being able to use its value. As a result, the process of executing instructions or even fetching new instructions becomes a serial process dependent on the execution of the state producing instruction getting committed to a quiescent state, which is visible to every microprocessor module that is affected by it. This serialization can introduce significant delays in the pipeline and diminish microprocessor performance.

BRIEF SUMMARY OF THE INVENTION

Accordingly, a need exists for a method and apparatus for a more efficient and flexible OOO processor architecture that is configured to mitigate the performance limiting issues associated with execution of state producing instructions, e.g., branches by exercising early data forwarding.

In one embodiment of the present invention, registers are provided at the front-end of the machine, e.g., towards the fetch stage that speculatively hold copies of the results of state producing instructions and make them available to instructions dependent on the state producing instruction without needing to wait for the state producing instructions to be committed to a quiescent state. This allows data to be speculatively made available at the early stage of the pipeline, e.g., at the fetch stage to the other instructions and prevents problems associated with serialization.

In one embodiment of the present invention, in an emulated architecture, branch targets that are required to allow guest branch instructions (being executed in native space) to compute their targets are stored speculatively in a guest branch target register at the front-end of the machine. In one embodiment, guest branch instructions write to the guest-target to this register if they are predicted to be taken. Subsequent instructions that require the guest-target to calculate either their own target (in the case of a branch instruction) or to use it as an operand can simply access it from the guest branch target register at the front-end of the machine instead of needing to wait for the earlier branch to execute and commit its values at the back-end of the machine. Accordingly, embodiments of the present invention allow for speculative maintenance of structures aiding in resolving data dependencies in early stages of a microprocessor. This is a significant advantage over conventional OOO processors wherein similar data forwarding cases are handled in the execution unit, which resides in the back-end of the machine.

In one embodiment, a microprocessor implemented method for performing early dependency resolution and data forwarding for instructions in a native space of an emulated architecture referencing a guest address is presented. The method comprises mapping a plurality of instructions in a guest address space into a corresponding plurality of instructions in a native address space. For each current guest branch instruction in the native address space fetched during execution, performing: (a) determining a youngest prior guest branch target stored in a guest branch target register, wherein the guest branch register is operable to speculatively store a plurality of prior guest branch targets corresponding to prior guest branch instructions; (b) determining a current branch target for a respective current guest branch instruction by adding an offset value for the respective current guest branch instruction to the youngest prior guest branch target; and (c) creating an entry in the guest branch target register for the current branch target.

In another embodiment, a processor unit configured for performing early dependency resolution and data forwarding for instructions in a native space of an emulated architecture referencing a guest address is presented. The method comprises mapping a plurality of instructions in a guest address space into a corresponding plurality of instructions in a native address space. For each current guest branch instruction in the native address space fetched during execution, performing: (a) determining a youngest prior guest branch target stored in a guest branch target register, wherein the guest branch register is operable to speculatively store a plurality of prior guest branch targets corresponding to prior guest branch instructions; (b) determining a current branch target for a respective current guest branch instruction by adding an offset value for the respective current guest branch instruction to the youngest prior guest branch target; and (c) creating an entry in the guest branch target register for the current branch target.

In a different embodiment, an apparatus configured to perform early dependency resolution and data forwarding for instructions in a native space of an emulated architecture referencing a guest address is disclosed. The apparatus comprises a memory and a processor communicatively coupled to the memory, wherein the processor is configured to process instructions out of order, and further wherein the processor is configured to perform a method. The method comprises mapping a plurality of instructions in a guest address space into a corresponding plurality of instructions in a native address space. For each current guest branch instruction in the native address space fetched during execution, performing: (a) determining a youngest prior guest branch target stored in a guest branch target register, wherein the guest branch register is operable to speculatively store a plurality of prior guest branch targets corresponding to prior guest branch instructions; (b) determining a current branch target for a respective current guest branch instruction by adding an offset value for the respective current guest branch instruction to the youngest prior guest branch target; and (c) creating an entry in the guest branch target register for the current branch target.

The following detailed description together with the accompanying drawings will provide a better understanding of the nature and advantages of the present invention.

BRIEF DESCRIPTION OF THE DRAWINGS

The invention may best be understood by referring to the following description and accompanying drawings that are used to illustrate embodiments of the invention. In the drawings.

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
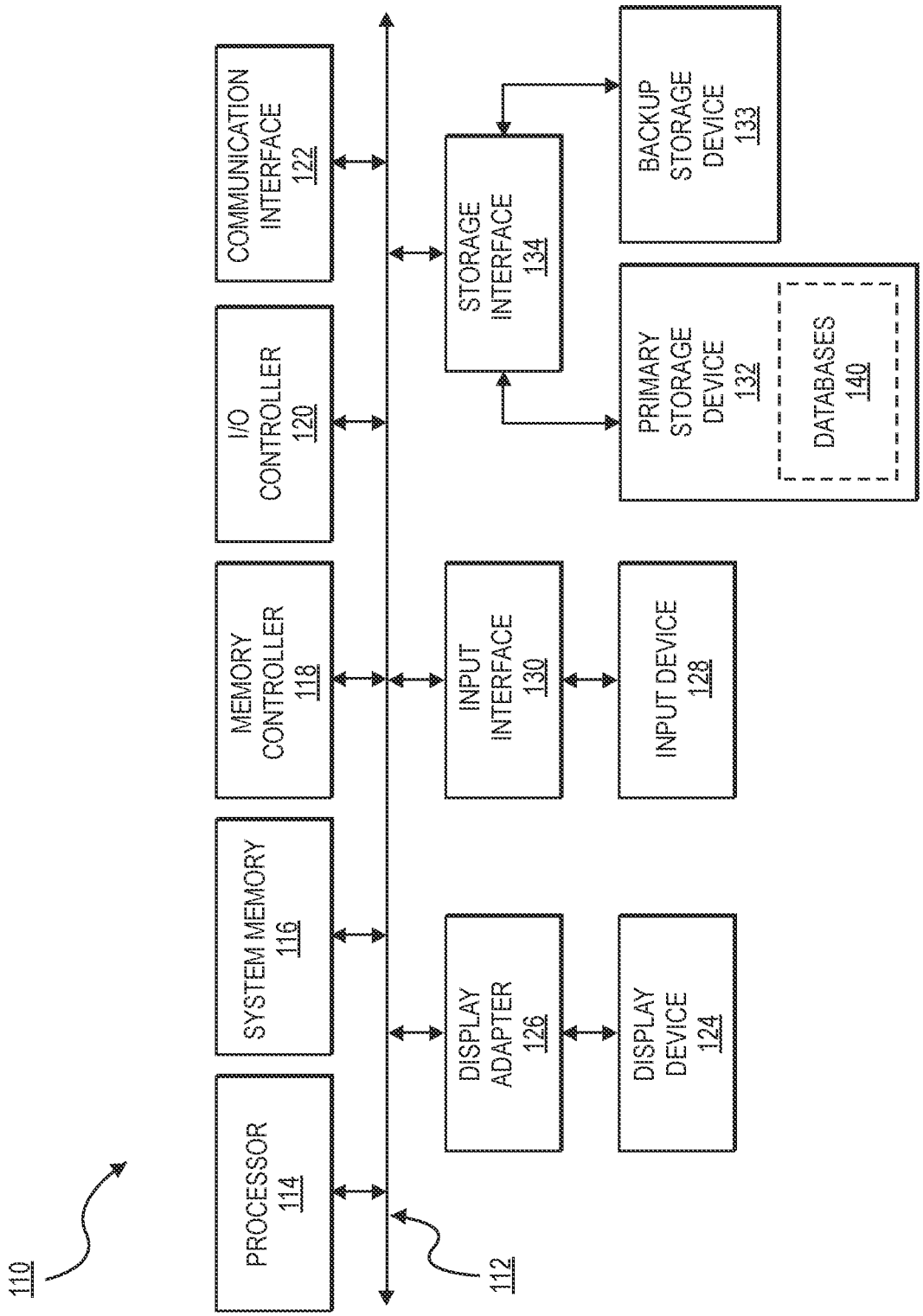
FIG. 1 is an exemplary computer system in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "mapping," "determining," "adding," "creating," "computing," "performing," "appending," "transmitting," "forwarding," or the like, refer to actions and processes (e.g., flowchart 700 of FIG. 7) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of being integrated with a processor 114 of an embodiment of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 of an embodiment of the present invention and a system memory 116.

Processor 114 incorporates embodiments of the present invention and generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. In one embodiment, processor 114 may be an out of order microprocessor. In a different embodiment, processor 114 may be a superscalar processor. In yet another embodiment, processor 114 may comprise multiple processors operating in parallel.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110. Alternatively, databases 140 may represent (be stored on) one or more physically separate devices capable of being accessed by a computing device, such as computing system 110.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Method and Apparatus to Allow Early Dependency Resolution and Data Forwarding in a Microprocessor In one embodiment, the present invention provides a method and apparatus for a more efficient and flexible OOO processor architecture that is configured to mitigate the performance limiting issues associated with execution of state producing instructions by exercising early data forwarding.

For example, a branch instruction is an example of a state producing instruction. In an emulated architecture, both guest and native states exist. The guest architecture is emulated on top of the native machine. Further, the address space used to define the instruction offset in the guest space is dissociated from the native address space. As a result, a guest branch instruction when executed in the native space does not have access to the corresponding Guest Program Counter (GPC) value in order to compute its target. The guest branch instruction, therefore, may require a branch target value from a prior guest branch instruction to calculate its own target. This results in a performance limiting case, because the prior guest branch would first need to commit the updated GPC value that is maintained in a General Purpose Register (GPR) at the back-end of the machine before the current guest branch instruction would have access to it. This prevents the fetch machine from making progress and results in serialization of the pipeline, causing significant delays.

Embodiments of the present invention allow the data generated by the guest branch instructions (e.g., the branch targets) to be made speculatively available early enough to the fetch machine by implementing certain registers in the front-end of the pipeline, e.g., registers to calculate the targets of the branch instructions.

Figure 2:
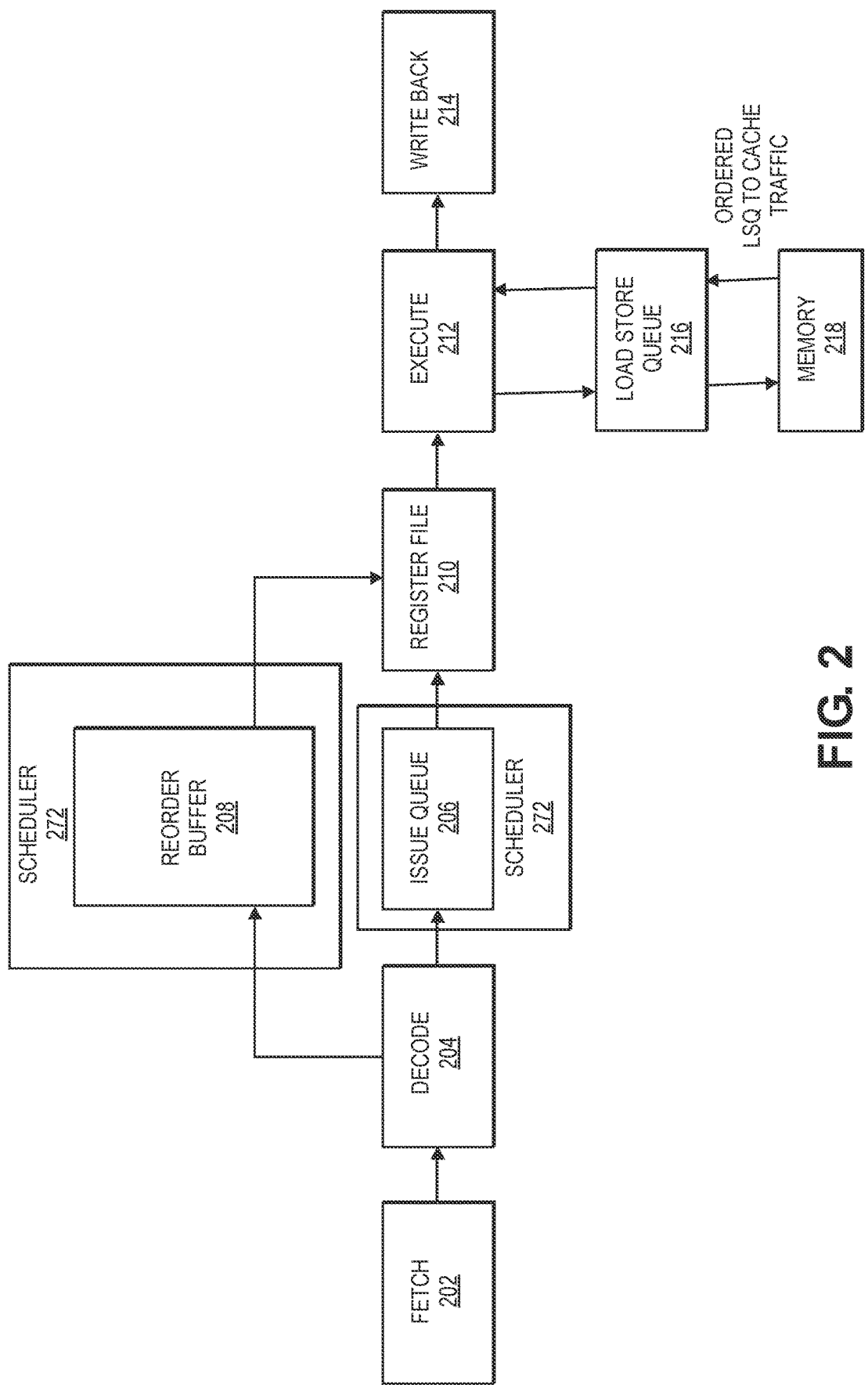
FIG. 2 is an exemplary diagram of pipe stages of a pipeline for an out of order microprocessor on which embodiments of the present invention can be implemented in accordance with one embodiment of the present invention.

FIG. 2 is a block diagram of pipe stages an exemplary pipeline for an OOO microprocessor in accordance with embodiments of the present invention.

Instructions are fetched at the fetch stage 202 and placed in the instruction fetch queue (IFQ) (not shown) within fetch stage 202. The instructions are generally the original assembly instructions found in the executable program. These instructions reference the architectural registers which are stored in register file 210. If the first fetched instruction was to be interrupted or raise an exception, the architectural register file 210 stores the results of all instructions until that point. Stated differently, the architectural register file stores the state that needs to be saved and restored in order to return back to the program break point during debugging or otherwise.

In an OOO microprocessor, the instructions execute out-of-order while still preserving data dependence constraints. Because instructions may finish in an arbitrary order, the architectural register file 210 cannot be modified by the results of out of order instructions as they finish because it would make it difficult to restore their values accurately in the event of an exception or an interrupt. Hence, every instruction that enters the pipeline is provided a temporary register where it can save its result. The temporary registers are eventually written into the architectural register file in program order when the associated instruction retires. Thus, even though instructions are being executed out of order, the contents of the architectural register files change as though they were being executed in program order.

The ROB 208 facilitates the process of instruction retirement. After the instructions are dispatched from the fetch unit 202, they are decoded by decode module 204 and are placed in the ROB 208 and issue queue 206 (IQ). The ROB 208 and IQ 206 may be part of a scheduler module 272. As instructions are issued out of IQ 206 out of order, they are executed by execute module 212. Instruction execution at 212 is allowed out of order as long as data dependencies are maintained.

In one embodiment, the write back module 214 will write the resulting values from those instructions back to the temporary registers in ROB 208 and rely on the ROB 208 to facilitate committing or "retiring" the instructions in order. However, in a different embodiment, write back module 214 writes the values resulting from instruction execution directly into register file 210 without sorting them. The unordered elements are added in physical memory to the register file 210 in an unordered fashion and are then retired to the architectural files in order at the retirement stage using a ROB initiated protocol.

The instructions issued out of order from the IQ 206 may also comprise loads and stores. As explained above, when loads and stores are issued out of order from the IQ 206, there are memory dependencies between them that need to be resolved before those instructions can be committed. Accordingly, the store instructions are stored in order in a Load Store Queue (LSQ) 216 while the dependencies between the loads and stores are resolved with the help of ROB 208.

Figure 3:
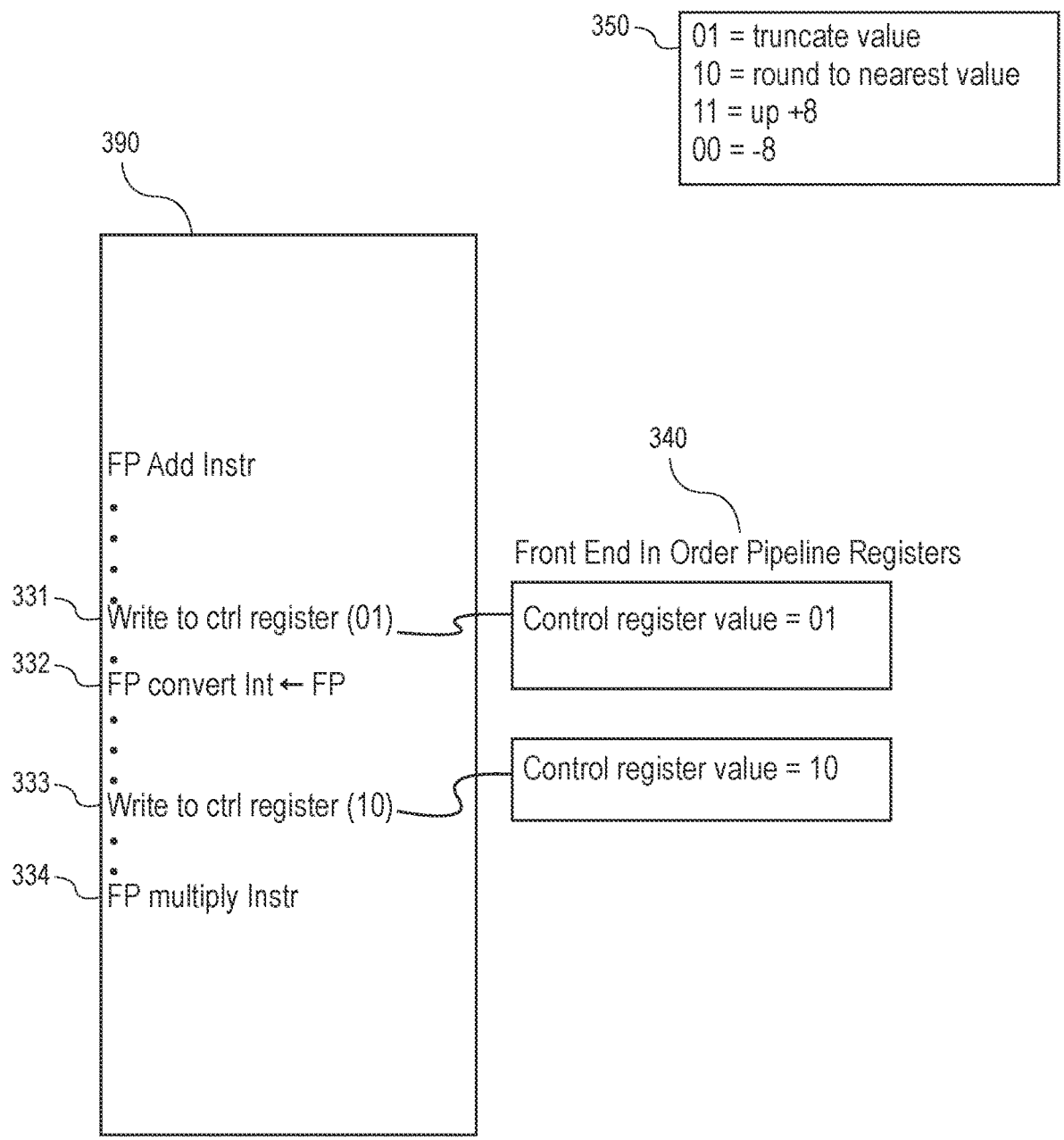
FIG. 3 illustrates an example of maintaining data for a general purpose register (GPR) speculatively in the front-end of the pipeline in accordance with an embodiment of the present invention.

FIG. 3 illustrates an example of maintaining data for a general purpose register (GPR) speculatively in the front-end of the pipeline in accordance with an embodiment of the present invention.

As discussed above, there are certain circumstances in a processor design where a value generated from a GPR, e.g., a control register could determine the control flow of the program or cause instructions or data values to be treated differently. For example, certain control flow instructions (also called state producing instructions) or branches may require data from a GPR to determine the manner in which to direct the flow of the program. However, because GPRs are maintained deep in the pipeline and are updated towards the end of the pipeline, a control flow instruction in a conventional OOO processor design would have to wait on the instruction(s) updating the associated GPR to execute and commit before being able to use the data. As a result, serialization is introduced in the pipeline because the execution of the control flow instruction and instructions subsequent to it are dependent on the resolution of the data in the GPR.

Embodiments of the present invention mitigate this performance-limiting problem by exercising early data forwarding. In one embodiment, the present invention speculatively maintains certain registers in the front end of the pipeline to be able to provide values from a GPR earlier to control flow instructions and branches as soon as they are fetched from Fetch stage 202 so that serialization and any resultant delays in the pipeline are avoided.

FIG. 3, for example, illustrates an exemplary instruction sequence 390. Instruction sequence 390 may comprise instructions, e.g., 331 that write to a rounding control register. Table 350 illustrates the different modes of the control register. The execution unit of the processor rounds the result of floating point (FP) instructions in accordance with the mode programmed in the control register. For example, a value of 01 programmed in the control register conveys to the execution unit that the result of all FP instructions should be truncated. Similarly, a value of 10 indicates that the result of all FP instructions should be rounded to the nearest value.

In a conventional OOO processor, instruction 332, which converts a floating point value to an integer, would have to wait for value 01 to be written to control register at the back-end of the pipeline before executing. This is because control registers in conventional OOO processors are typically not renamed and, accordingly, instruction 331 acts as a serializing instruction. Instruction 332 and subsequent instructions, therefore, need to wait until instruction 331 reaches the back end of the machine, commits and changes the value of the control register before starting to execute again.

In one embodiment of the present invention, register entry 340 can be maintained in the front-end in-order part of the pipeline where values for the control register can be stored speculatively for quicker access. Thus, instead of waiting for instruction 331 to commit its value at the back-end of the machine, a speculative copy of the control register can be maintained at the front end of the machine in pipeline register 340, where it can be accessed soon after instruction 331 is fetched. In one embodiment, every subsequent instruction following instruction 331 is tagged with the speculative value of the control register. This allows subsequent instructions to have immediate access to the correct control register value when they are executed. It also allow the pipeline to be flushed easily in case of a misprediction.

Similarly, for instruction 333, a speculative copy of the control register with value 10 can be maintained at the front end of the machine in pipeline register 340. Every instruction subsequent to instruction 333, e.g., FP instruction 334 is then tagged with this more recent value of the control register.

Eventually, the control register instructions, e.g., 331 and 333 reach the back-end of the machine, where they are retired and the values are updated. However, by this point all the instructions in sequence 390, e.g., instructions 332 and 334 have received the correct values speculatively at the front-end. Accordingly, the delaying effect of serializing instructions 331 and 333 are mitigated.

Figure 4:
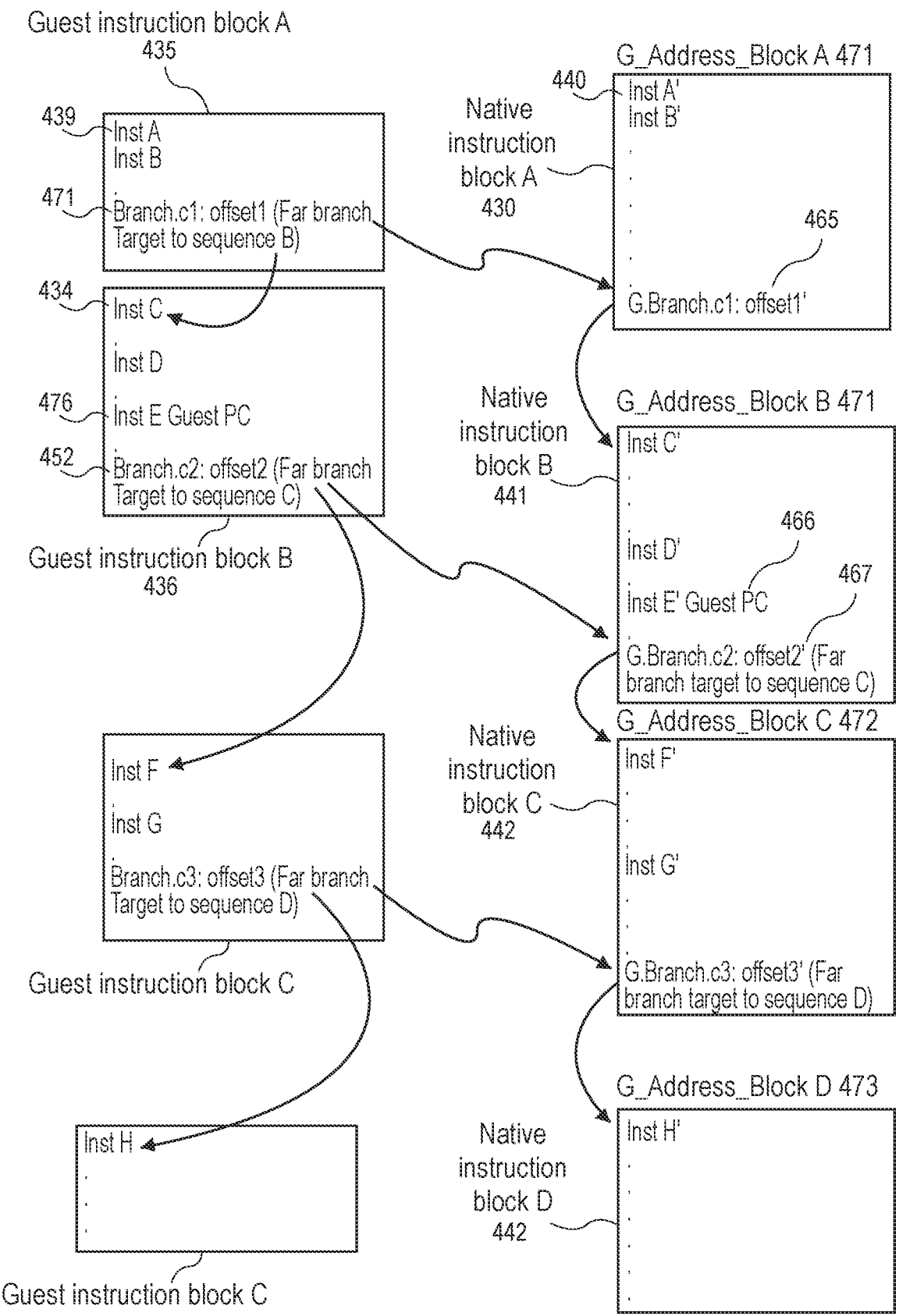
FIG. 4 illustrates the manner in which far branches are processed in an emulated architecture by maintaining registers at the front-end of the pipeline in accordance with one embodiment of the present invention.

FIG. 4 illustrates the manner in which far branches are processed in an emulated architecture by maintaining registers at the front-end of the pipeline in accordance with one embodiment of the present invention.

As described in detail in related U.S. application Ser. No. 13/359,767, filed Jan. 27, 2012 (now U.S. Pat. No. 9,710,387, issued Jul. 18, 2017), titled, "GUEST INSTRUCTION TO NATIVE INSTRUCTION RANGE BASED MAPPING USING A CONVERSION LOOK ASIDE BUFFER OF A PROCESSOR" which is hereby incorporated by reference (hereinafter "U.S. Pat. No. 9,710,387"), guest instruction blocks are converted or mapped into native conversion blocks in an emulated architecture. As described in U.S. Pat. No. 9,710,387, guest instructions in an emulated architecture can be from a number of different guest instruction architectures (e.g., Java, x86, MIPS etc.) and multiple guest instruction blocks can be converted into one or more corresponding native conversion blocks. This conversion occurs on a per instruction basis.

Also, as described in U.S. Pat. No. 9,710,387 and shown in FIG. 4, in one embodiment, every instruction block, both guest instruction blocks and native instruction blocks, conclude with a far branch. (The difference between near branches and far branches are detailed in U.S. Pat. No. 9,710,387, however, for purposes of the embodiments of the present invention, far branches are used as examples and will hereinafter be referred to as "branches.") For example, guest instruction block A 435 concludes with a branch 471 predicted to jump to guest instruction block B 436, guest instruction block B concludes with a branch 452 predicted to jump to guest instruction block C 437, etc. The branch is a jump to the next subsequent instruction block or sequence of instructions in memory.

As discussed above, when a guest architecture is emulated on top of a native machine, the address space used to define the instruction offset in the guest space is disassociated from the native address space. As a result, the branch targets from the guest branches are required to calculate the targets of any future guest branches (whose targets are often presented as addresses relative to the respective addresses in the emulated address space).

Processing guest branches that require targets from earlier branches in order to compute their own targets results in a performance limiting condition in emulated architectures of conventional OOO processors. As mentioned above, a guest branch instruction when executed in the native space does not have access to the corresponding Guest Program Counter (GPC) value in order to compute its target. The guest branch instruction, therefore, may require a branch target value from a prior guest branch instruction to calculate its own target. This is a performance limiting case, because the prior guest branch would first need to commit the updated GPC value that is maintained in a General Purpose Register (GPR) at the back-end of the machine before the current guest branch instruction would have access to it.

In order for the fetch stage 202 to continue making progress and to prevent serialization of the pipeline, these guest branch instructions require targets from earlier branches sooner than the delay associated with waiting for the earlier branches to be resolved in the back-end of the machine. For example, when executing branch instruction G.Branch.c2 467 (FIG. 4) in native instruction block B 441, which is a converted instruction corresponding to branch instruction Branch.c2 452 in guest instruction block B 436, the target of the earlier branch G.Branch.c1 465 is required to compute the target for branch 467. As will be discussed in detail below, embodiments of the present invention allow a speculative target value to be provided to branch 467 without having to wait for the target of the earlier branch 465 to be committed at the back-end of the pipeline.

As mentioned above, the target of a guest branch (a branch whose target is an address in the guest space or emulated slave space) is often presented as an offset relative to the address of the guest branch in the emulated address space. For example, offset1 is an address relative to the address (Guest Program Counter) of the instruction Branch.c1 in instruction 4 71. Because of the dissociation between the native and guest address spaces, instruction 465 in native space, which corresponds to instruction 471 in guest space, will have a different program counter than the Guest Program Counter (GPC) of instruction 471. Accordingly, when executing instruction 465, the corresponding GPC is required which is then added to the offset1' value from instruction 465 to compute the branch target. The branch target so calculated will also be needed for the subsequent branch, e.g., instruction G.Branch.c2' 467 to compute the target for that branch.

Once the branch target is determined in the emulated address space (e.g., once the GPC value of the branch target is determined), it is then converted to native space using a conversion look-aside buffer (CLB) as discussed in U.S. Pat. No. 9,710,387 to provide the corresponding target in native address space.

In a conventional emulated architecture, processing instruction 467 would require waiting until instruction 465 had finished calculating the branch target and committed its value post-execution at the back-end of the pipeline. It should be noted, that guest branch instruction 467 (G.Branch.c2) needs to compute its target in the emulated address space because, as mentioned above, the target of a guest branch is typically presented as an offset relative to its address in the emulated address space. Accordingly, offset2' is tied to the emulated address space and instruction 467 needs to compute its target in the guest address space.

Before instruction 467 computes its target address in a conventional emulated architecture, it must wait until instruction 465 has computed its branch target and committed the results. Waiting until instruction 465 has computed its branch target and committed the results entails waiting until instruction 465 has executed, computed its branch target in the emulated address space, committed the resultant values in the back-end of the machine and converted the guest address over to a corresponding native address in native instruction block B 441 using a CLB. Accordingly, in a conventional OOO processor, instruction 465 would act as a serializing instruction, thereby delaying the subsequent guest branch, e.g., instruction 467 and any instructions following it.

Embodiments of the present invention circumvent this problem by maintaining a guest branch target register (GBTR) in the front-end of the pipeline, which stores the targets of the guest branches speculatively so that the data is readily available to the fetch machine. In one embodiment, the invention provides a mechanism to maintain a pipelined GBTR in the front-end of the machine. Guest branch instructions write to this register with the guest-target if they are predicted to be taken.

It should be noted that maintaining the GBTR at the front-end of the machine allows every native instruction block to implicitly maintain a corresponding guest address for the starting instruction within the respective native instruction block. For example, in FIG. 4, G_Address_Block A 471 is the corresponding guest address maintained within the GBTR for the starting address of native instruction block A 430. G_Address_Block A 471 is the corresponding guest address for the starting instruction of block A 430, e.g., Inst A' 440. Assuming guest instruction block A 435 is the first instruction block in the user-defined code, then G_Address_Block A 471 is simply the starting GPC of the instruction sequence of guest instruction block A 435. The starting entry into the GBTR is typically populated by software at the time of mapping the guest instruction blocks into native conversion blocks.

Similarly, G_Address_Block B 474 is the corresponding guest address maintained in the GBTR for the starting address of native instruction block B 441. G_Address_Block C 472 is the corresponding guest address maintained in GBTR for the starting address of native instruction block C 442. G_Address_Block D 473 is the corresponding guest address maintained in GBTR for the starting address of native instruction block D 443. Accordingly, a guest address is implicitly maintained in the front-end of the pipeline for each instruction sequence boundary. Prior guest addresses implicitly maintained in the GBTR for the instruction sequence boundaries are used to calculate the branch targets of subsequent guest branches, e.g., the corresponding guest address of G.Branch.c1 465 is used to calculate the corresponding guest address for G.Branch.c2 467, etc., at execution time. The subsequent guest branch targets are then populated into the GBTR as will be discussed in FIG. 5.

It should be noted that because only the guest address corresponding to the start of any native instruction block is available for the calculation of the guest branch targets at execution time, the offset values for each of the guest branch instructions needs to be adjusted to account for this when mapping the instructions from guest space into native space. For example, guest branch, G.Branch.c2 467 does not have access to the GPC of corresponding guest instruction 452, but it does have access to guest address G_Address_Block B 474. Accordingly, offset2' needs to be adjusted to account for the difference in GPC between Inst C 434 and Branch.c2 instruction 452 (because recall that G_Address_Block B 474 is the guest address corresponding to the start of guest instruction block B 436).

In one embodiment, this adjustment of offset values is made by software during the initial mapping when instruction 452 Branch.c2 is mapped over from guest address space to corresponding instruction 467 G.Branch.c2 in native address space. Accordingly, the value of offset2 from instruction 452 is adjusted to a value of offset2' for instruction 467. The updated offset value, offset2', added to guest address, G_Address_Block B 474 will yield the correct branch target address, which can then be added to the GBTR as will be discussed in FIG. 5. Because the branch target address so calculated will be in emulated space, a CLB will be required to convert it to over to a corresponding native space address.

Figure 5:
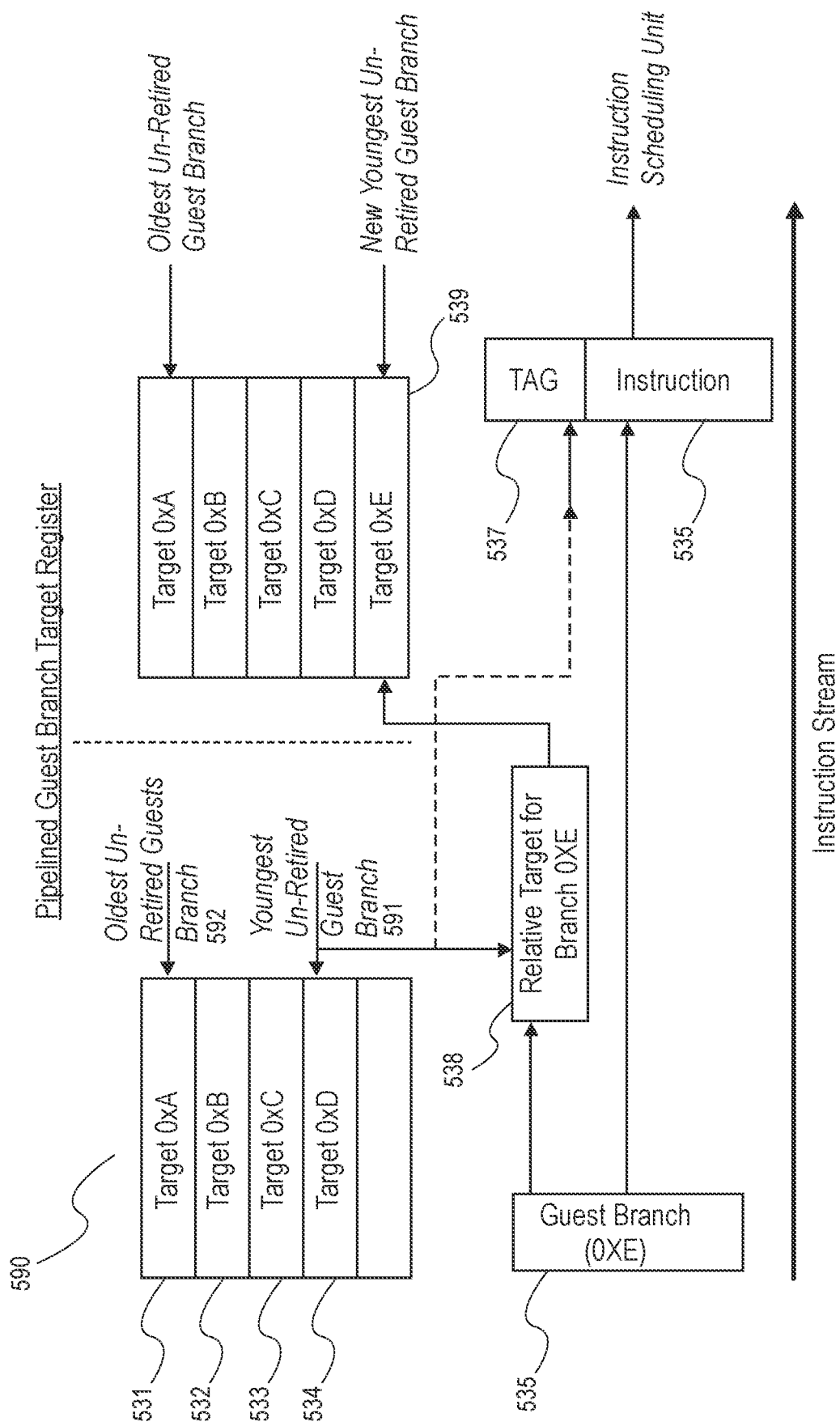
FIG. 5 illustrates the manner in which the pipelined guest branch target register is updated using a prior branch target in accordance with one embodiment of the present invention.

FIG. 5 illustrates the manner in which the pipelined guest branch target register is updated using a prior branch target in accordance with one embodiment of the present invention. During execution, if a guest branch instruction 535 (e.g., instruction 467, G.Branch.c2) is encountered and predicted to be taken, in one embodiment, the GBTR 590 needs to be updated. The offset value determined in software for that instruction (e.g. offset2'), as discussed above, is added to the prior branch target 534 by module 538 to yield a new guest branch target, which is stored in GBTR 590 at entry 539 as the new youngest unretired guest branch. Further, when the new branch target is added to the GBTR, the youngest unretired guest branch pointer 591 to the register is updated to point to the newly added target. As seen from FIG. 5, the new entries are added to the GBTR on a FIFO basis—the first branch entered will also be the first to be retired from the queue.

The embodiments of the present invention therefore advantageously allow resolution of the branch target address earlier in the pipeline (e.g., at the fetch stage) as compared with conventional solutions that wait for the process of the prior branch instructions to finish execution at the back-end of the machine and commit their values.

As stated above, the guest addresses stored in the GBTR can be mapped back to native address space by using a CLB as discussed in detail in U.S. Pat. No. 9,710,387.

Similar to guest branch target 539, the other guest branch targets are also determined using prior guest branch targets. For example, branch target 534 is determined using branch target 533. Branch target 533 is determined using branch target 532, and so forth. As discussed with respect to entry G_Address_Block A 471 in FIG. 4, target 531 (0xA) may either be the starting guest address of the user's code sequence or alternatively, it could be the target of the youngest retired guest branch. If the latter, then entry 531 comprises the oldest unretired guest branch.

It should be noted that all values in the GBTR are updated speculatively. Because register values are updated speculatively, in one embodiment, multiple copies of the GBTR to be maintained in the front-end of the pipeline. Further, in one embodiment, read and write pointers are maintained within the GBTR. In one embodiment, the pointers allow the most current value in the register to be easily retrieved. For example, a pointer 591 is maintained that allows the youngest unretired guest branch to be retrieved from the GBTR. Also, a pointer 592 to the oldest unretired guest branch can be maintained.

In one embodiment, in addition to being updated when new targets are added to the register, the pointers to a GBTR can also be updated on the flush or retirement of an instruction. If an instruction is flushed or retired, both pointers 592 and 591, for example, would need to be updated. To enable flushing, each instruction carries as a tag, which, in one embodiment, can be a pointer to the last branch instruction that updated this register. In a different embodiment, the branch target can itself be appended to the instruction as a tag. For example, as shown in FIG. 5, a tag component 537 gets appended to the instruction component 535 of guest branch 535 before being dispatched to the instruction scheduling unit.

Figure 6:
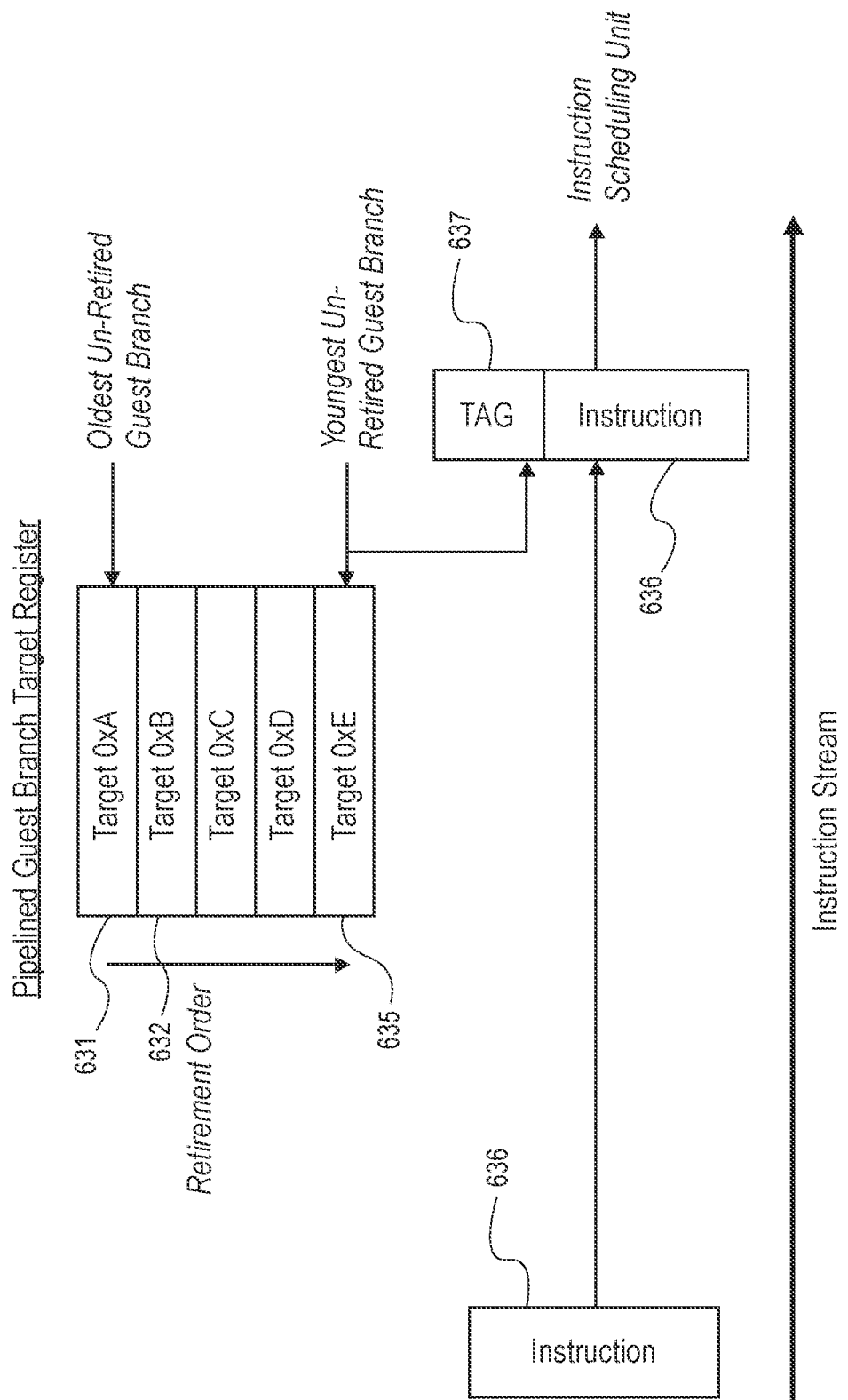
FIG. 6 illustrates the manner in which each instruction fetched is tagged with information about the last branch instruction that updated the guest branch target register in accordance with one embodiment of the present invention.

FIG. 6 illustrates the manner in which each instruction fetched is tagged with information about the last branch instruction that updated the guest branch target register in accordance with one embodiment of the present invention. As shown in FIG. 6, the oldest unretired guest branches in the GBTR get retired before the youngest unretired guest branches. So target 0xA is retired prior to target 0xB 632 and so on. When a new instruction 636 is fetched, it will typically get tagged with the branch target of the youngest unretired guest branch 635. This tag 637 can either be a pointer or the actual value of the branch target. The instruction is then dispatched to the scheduler 272. The tagging is advantageous because in case of a pipeline flush, it helps identify the relative position of each instruction. For example, if all instructions between target 0xA 631 and target 0xB 632 needed to be flushed, the tag would enable those instructions to be easily identified.

Further, in one embodiment of the present invention, the tagging is useful for non-branch instructions that operate on the guest program counter value. For example, Inst E 466 in FIG. 4 needs the GPC value as an operand. However, the GPC is unavailable in the native address space. Accordingly, tagging every instruction by attaching the current value of the GBTR as an immediate-value to the instruction and sending it along with the instruction is useful because the branch target can be used to calculate the corresponding GPC value for instruction 466 (which is the GPC value for instruction 476 in guest address space). This advantageously enables the register, which is exercised in the back-end of the processor, to be available readily in the front-end of the processor.

The embodiments of the present invention advantageously also eliminate the read-after-write dependency between the guest-branch and the instruction requiring a read of this register. The data is forwarded from the producer to a subsequent consumer. This allows the guest-branch and the subsequent instruction to execute in any order thus eliminating the performance problem stemming from the serialization required as a result of a data dependency.

The embodiments of the present invention provides a low-cost maintenance mechanism wherein an implicit update of the guest branch target registers can be performed. Explicit update of these registers by software requires serialization and flushing of the machine. By comparison, the embodiments of the present invention allows for speculative maintenance of structures aiding in resolving data dependencies in early stages of a microprocessor. This is a significant advantage over conventional OOO processors wherein similar data forwarding cases are handled in the execution unit 212, which resides in the back-end of the machine.

Finally, instruction 6 also demonstrates the retirement order of the branches entered in the GBTR. As mentioned above entries are entered into the GBTR on a FIFO basis. Accordingly, the earliest entered target, e.g. instruction 631 will be the first to be retired.

Figure 7:
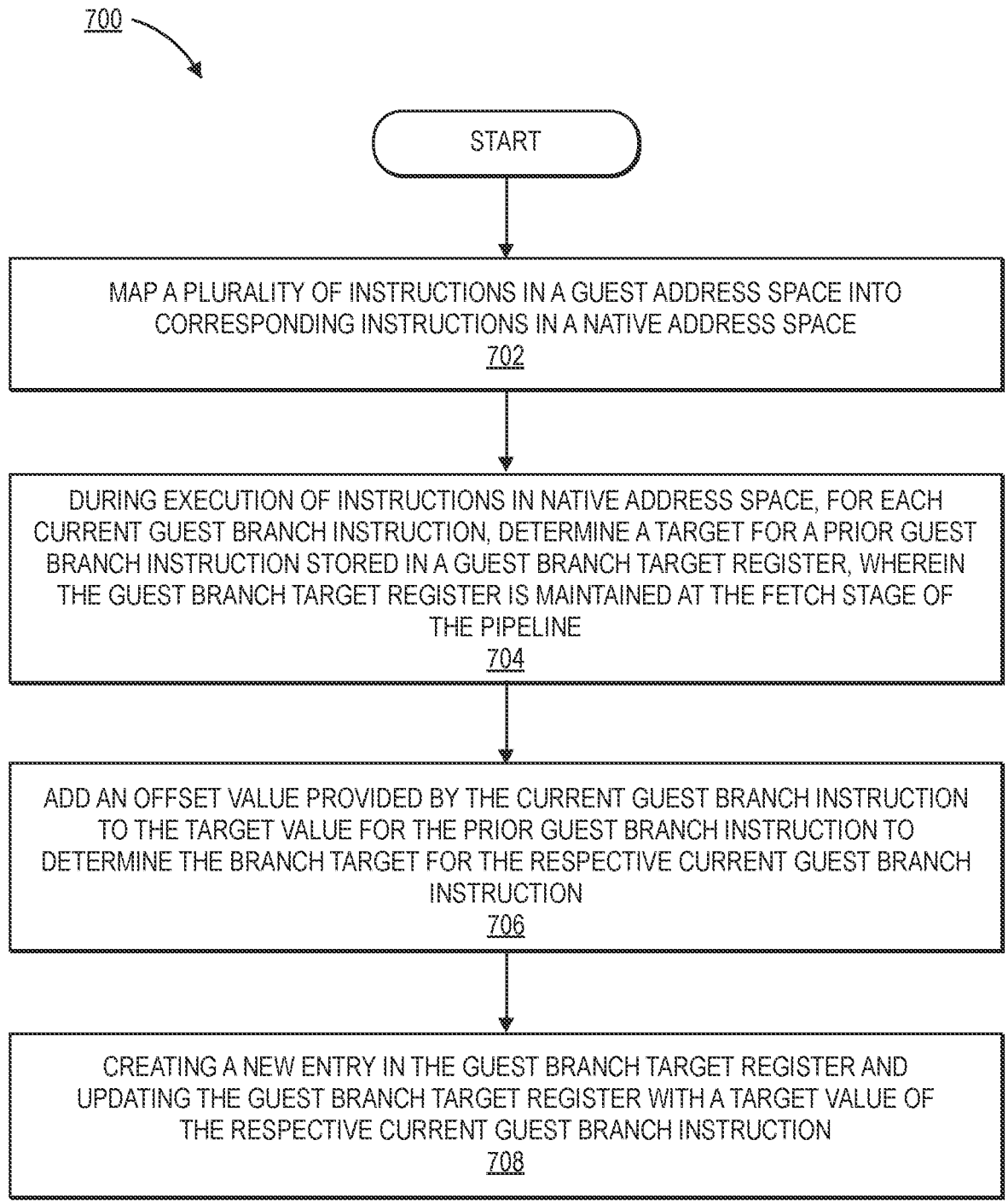
FIG. 7 depicts a flowchart 700 for an exemplary computer controlled process for performing early dependency resolution and data forwarding for instructions in the native space of an emulated architecture referencing a guest address in accordance with embodiments of the present invention.

FIG. 7 depicts a flowchart 700 for an exemplary computer controlled process for performing early dependency resolution and data forwarding for instructions in the native space of an emulated architecture referencing a guest address in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 7 should not be construed as limiting the scope of the invention. Rather, it will be apparent to persons skilled in the relevant art(s) from the teachings provided herein that other functional flows are within the scope and spirit of the present invention. Flowchart 700 may be described with continued reference to exemplary embodiments described above, though the method is not limited to those embodiments. Process 700 may also be implemented in hardware in one embodiment.

At step 702, a plurality of instructions are mapped from a guest address space to a native address space.

At step 704, the instructions in the native address space begin executing. For each current guest branch instruction that is encountered while fetching the instructions, a branch target value is determined for a prior guest branch by performing a look-up in a GBTR. As mentioned above, this typically takes place at the front-end of the machine, e.g., at the fetch stage. The GBTR, as discussed above, is a series of registers maintained to speculatively store the branch targets of guest branches at the front-end of the machine, e.g., at the fetch stage. The prior guest branch target looked up in the GBTR is used to speculatively determine the branch target for the current guest branch instruction, so that the information regarding where the current branch instruction jumps to is available at the front end of the pipeline. This is in contrast to conventional processors that need to wait for prior guest branches to resolve completely at the back end of the machine before allowing subsequent guest branches to proceed forward.

At step 706, an offset value from a respective current guest branch instruction is added to the target value for the prior guest branch (looked-up in the GBTR) in order to determine the branch target for the respective current guest branch instruction.

Finally, at step 708, a new entry is creating in the GBTR for the newly determined branch target (of the current guest branch instruction) and the GBTR is updated by adding this branch target to the new entry. This entry now becomes the youngest unretired guest branch and the pointer to the youngest unretired guest branch is updated accordingly in the GBTR.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A microprocessor implemented method comprising:
    mapping a plurality of instructions in a guest address space to a corresponding plurality of instructions in a native address space; and
    for each of one or more guest branch instructions in said native address space fetched during execution, performing:
        determining a youngest prior guest branch target stored in a guest branch target register, wherein said guest branch target register is to speculatively store a plurality of prior guest branch targets corresponding to prior guest branch instructions, and wherein said guest branch target register is maintained at a fetch stage of a pipeline,
        determining a branch target for a respective guest branch instruction by adding an offset value for said respective guest branch instruction to said youngest prior guest branch target, wherein said offset value is an adjusted offset that is adjusted during said mapping to account for a difference in address in said guest address space between an instruction at a beginning of a guest instruction block and a branch instruction in said guest instruction block that corresponds to said respective guest branch instruction, wherein said offset value is obtained from said respective guest branch instruction in said native address space during said execution, and
        creating an entry in said guest branch target register for said branch target.

2. The method of claim 1, wherein said creating includes:
    updating a pointer to said youngest prior guest branch target to point to said branch target in said guest branch target register.

3. The method of claim 1, wherein said guest branch target register includes a first-in-first-out (FIFO) queue, and wherein said guest branch target register maintains a pointer to an oldest unretired guest branch target within said guest branch target register and maintains a pointer to a youngest unretired guest branch target within said guest branch target register.

4. The method of claim 3, further comprising retiring instructions in said guest branch target register in order, wherein said oldest unretired guest branch target is retired first, and wherein said youngest unretired guest branch target is retired last.

5. The method of claim 1, further comprising for each of said one or more guest branch instructions in said native address space fetched during execution:
    appending information associated with said youngest prior guest branch target in a tag field to said respective guest branch instruction and
    transmitting said respective guest branch instruction to a scheduling stage of said pipeline of an out-of-order micro-architecture.

6. The method of claim 1, further comprising for each of one or more non-branch instructions in said native address space fetched during execution:
    appending information associated with said youngest prior guest branch target in a tag field to a respective non-branch instruction and
    forwarding said respective non-branch instruction to a scheduling stage of said pipeline of an out-of-order micro-architecture.

7. A processor including circuitry to perform operations for processing branch instructions in an emulated architecture, said operations comprising:
    map a plurality of instructions in a guest address space into a corresponding plurality of instructions in a native address space; and
    for each of one or more guest branch instructions in said native address space fetched during execution, performing:
        determining a youngest prior guest branch target stored in a guest branch target register, wherein said guest branch target register is to speculatively store a plurality of prior guest branch targets corresponding to prior guest branch instructions,
        determining a branch target for a respective guest branch instruction by adding an offset value for said respective guest branch instruction to said youngest prior guest branch target, wherein said offset value is an adjusted offset that is adjusted during said mapping to account for a difference in address in said guest address space between an instruction at a beginning of a guest instruction block and a branch instruction in said guest instruction block that corresponds to said respective guest branch instruction, wherein said offset value is obtained from said respective guest branch instruction in said native address space during said execution, and
        creating an entry in said guest branch target register for said branch target.

8. The processor of claim 7, wherein said creating includes:
    updating a pointer to said youngest prior guest branch target to point to said branch target in said guest branch target register.

9. The processor of claim 7, wherein said guest branch target register includes a first-in-first-out (FIFO) queue, and wherein said guest branch target register maintains a pointer to an oldest unretired guest branch target within said guest branch target register and maintains a pointer to a youngest unretired guest branch target within said guest branch target register.

10. The processor of claim 9, wherein said operations further comprise retiring instructions in said guest branch target register in order, wherein said oldest unretired guest branch target is retired first, and wherein said youngest unretired guest branch target is retired last.

11. The processor of claim 7, wherein said operations further comprise for each of said one or more guest branch instructions in said native address space fetched during execution:
    appending information associated with said youngest prior guest branch target in a tag field to said respective guest branch instruction and
    transmitting said respective guest branch instruction to a scheduling stage of a pipeline of an out-of-order micro-architecture.

12. The processor of claim 7, wherein said operations further comprise for each of one or more non-branch instructions in said native address space fetched during execution:
   appending information associated with said youngest prior guest branch target in a tag field to a respective non-branch instruction and
   forwarding said respective non-branch instruction to a scheduling stage of a pipeline of an out-of-order microarchitecture.

13. An apparatus to process branch instructions in an emulated architecture, said apparatus comprising:
   a memory; and
   a processor communicatively coupled to said memory, wherein said processor is to process instructions out of order, and wherein said processor includes circuitry to perform operations comprising:
      mapping a plurality of instructions in a guest address space into a corresponding plurality of instructions in a native address space and
      for each of one or more guest branch instructions in said native address space fetched during execution, performing:
         determining a youngest prior guest branch target stored in a guest branch target register, wherein said guest branch target register is to speculatively store a plurality of prior guest branch targets corresponding to prior guest branch instructions,
         determining a branch target for a respective guest branch instruction by adding an offset value for said respective guest branch instruction to said youngest prior guest branch target, wherein said offset value is an adjusted offset that is adjusted during said mapping to account for a difference in address in said guest address space between an instruction at a beginning of a guest instruction block and a branch instruction in said guest instruction block that corresponds to said respective guest branch instruction, wherein said offset value is obtained from said respective guest branch instruction in said native address space during said execution, and
         creating an entry in said guest branch target register for said branch target.

14. The apparatus of claim 13, wherein said creating includes:
   updating a pointer to said youngest prior guest branch target to point to said branch target in said guest branch target register.

15. The apparatus of claim 13, wherein said guest branch target register includes a first-in-first-out (FIFO) queue, and wherein said guest branch target register maintains a pointer to an oldest unretired guest branch target within said guest branch target register and maintains a pointer to a youngest unretired guest branch target within said guest branch target register.

16. The apparatus of claim 15, wherein said operations further comprise retiring instructions in said guest branch target register in order, wherein said oldest unretired guest branch target is retired first, and wherein said youngest unretired guest branch target is retired last.

17. The apparatus of claim 13, wherein said operations further comprise for each of said one or more guest branch instructions in said native address space fetched during execution:
   appending information associated with said youngest prior guest branch target in a tag field to said respective guest branch instruction and
   transmitting said respective guest branch instruction to a scheduling stage of a pipeline of an out-of-order microarchitecture.

18. The apparatus of claim 13, wherein said operations further comprise for each of one or more non-branch instructions in said native address space fetched during execution:
   appending information associated with said youngest prior guest branch target in a tag field to a respective non-branch instruction and
   forwarding said respective non-branch instruction to a scheduling stage of a pipeline of an out-of-order microarchitecture.

* * * * *